(No Model.)
J. GRIDLEY.
PROCESS OF AND APPARATUS FOR CONCENTRATING SULPHURIC ACID.
No. 265,495. Patented Oct. 3, 1882.
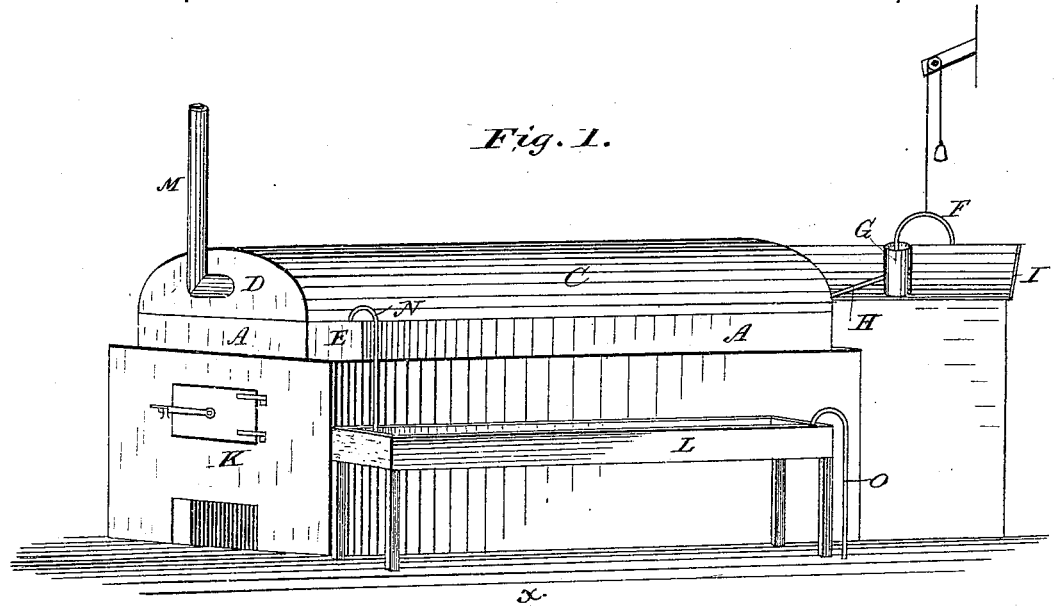
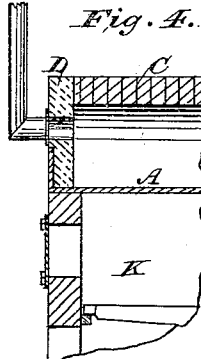
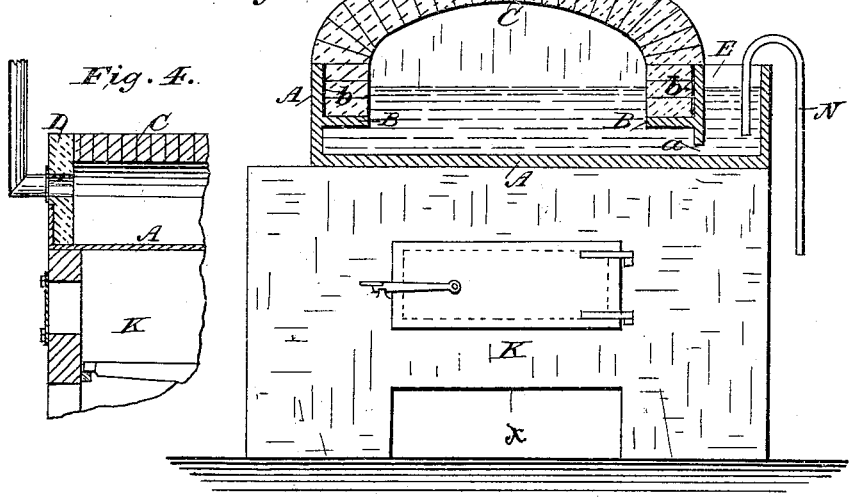
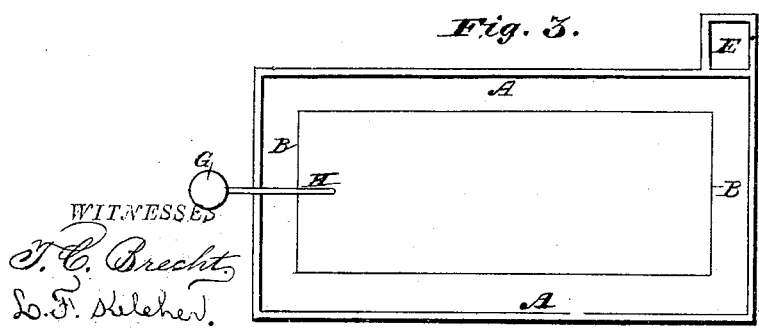
WITNESSES
T. C. Brecht
L. F. Skleher
INVENTOR
Junius Gridley,
By Wm. C. McIntire
Attorney

UNITED STATES PATENT OFFICE.

JUNIUS GRIDLEY, OF BROOKLYN, NEW YORK.

PROCESS OF AND APPARATUS FOR CONCENTRATING SULPHURIC ACID.

SPECIFICATION forming part of Letters Patent No. 265,495, dated October 3, 1882.

Application filed August 7, 1882. (No model.)

*To all whom it may concern:*

Be it known that I, JUNIUS GRIDLEY, a citizen of the United States, residing at Brooklyn, New York, have invented new and useful Improvements in the Process of and Apparatus for Concentrating Sulphuric Acid, of which the following is a specification.

My invention relates to certain new and useful improvements in the process of and apparatus for concentrating sulphuric acid.

The concentration of sulphuric acid is now and has heretofore been almost exclusively carried on in retorts composed of either platinum or glass in various forms, for the reason that ordinary iron retorts were impracticable, owing to the fact that dilute sulphuric acid acts upon the iron, forming a sulphate which tends to a rapid destruction of the metal and an impure acid as a natural result. As between the platinum and the glass as desirable materials for retorts, the former is the most satisfactory; but its great cost entails so serious an outlay that it has given to manufacturers having the means to employ it almost a monopoly of the manufacture of strong sulphuric acid. Where glass retorts are used the results are to a considerable extent unsatisfactory, because of the large amount of fuel required, the frequent breakages, and consequent wear and tear, and, in addition to the disadvantages named, the employés are exposed to considerable danger.

The object of my invention is the concentration of dilute sulphuric acid in cast-iron vessels in such a manner that the iron is not acted upon by the acid, thereby rendering iron vessels for that purpose as effective as platinum.

My invention is based upon the fact that sulphuric acid of 66° Baumé strength at 60° Fahrenheit has little or no action on cast-iron; and my invention consists, first, of the process of introducing a small stream of dilute acid from the evaporating-pans, of the strength, say, of 60° Baumé, into a large quantity—say one ton or more—of acid of the strength of 66° Baumé contained in a concentrating-pan or retort charged originally with acid at 66° strength, and kept thereafter at the boiling-point, the feed of dilute acid to be so regulated as not to reduce the acid in the concentrating-pan or retort below 65° Baumé at the surface or acid line, at which point and four inches below the surface the iron at the sides is protected from the action of the acid, as will be hereinafter set forth.

The second part of my invention relates to the apparatus for carrying out my invention; and it consists of a cast-iron pan mounted and protected as hereinafter described.

In the accompanying drawings, representing my improved apparatus, Figure 1 represents a side elevation; Fig. 2, a cross-section; Fig. 3, a top plan view of the pan, and Fig. 4 a partial longitudinal vertical section at the line $x\ x$ of Fig. 2.

Similar letters indicate like parts in the several figures.

A represents a cast-iron pan four by eight feet and one foot in depth, cast with a heavy inwardly-projecting flange, B, preferably about four inches from the bottom, this flange B serving as a foundation or support for the arch C and ends D. The pan A should be one and a half inch thick on the bottom and one and a quarter inch thick on the sides. At one corner of the pan is formed integral therewith a pocket, E, about six inches wide, six inches long, and of the depth of the pan A, connected at the bottom with said pan by an orifice, as shown at $a$, Fig. 2.

The arch C, covering the pan A, is formed of fire-brick set in fire-clay, with a backing of asbestus retort-cement, $b$, between the bricks and the sides of the pan above the flange B. The ends are closed by tiles D, made in one piece, with suitable openings for feed and vapor pipes, and capable of ready removal for ingress to the interior of the pan.

F represents the feed by means of an adjustable siphon from the evaporating-pan into a cup, G, and thence by a pipe, H, through the end tile into the pan A, the waste heat of the furnace being conveyed through a flue under the evaporating-pan I.

K is a furnace underneath the pan, and L a cooler arranged below the pocket E. At one end of the pan is arranged a pipe, M, for carrying off the vapors.

The concentrated acid in the pan A is drawn from the pocket E by a siphon, N, into the cooler L, from whence it is taken to the bottling-tanks by a siphon, O. As the pan would have a boiling-surface of about twenty-four square feet, the heat that can be practically brought to bear upon it will concentrate from seven to ten tons of acid in twenty-four hours with an economic expenditure of fuel.

The apparatus, being simple in construction, will not be liable to get out of order, and with proper care in thoroughly cleansing the pan when not in use will last for several years, and the pan can, when necessary, be renewed at very small cost.

To those skilled in the art of concentrating sulphuric acid it will be understood that the strongest acid is always at the bottom of the retort and the light acid at the surface, so that in the practice of my process with my improved apparatus the flange B will always be below the weak-acid line, while the sides that would otherwise be exposed to the action of the weaker acid are protected by the fire-brick of the arch and the asbestos retort-cement, which is impervious to boiling acid when confined between surfaces.

I am aware that weak acid mixed with sulphate of iron has been continuously introduced into the concentrating-pan, as described in English Patent No. 2,839 of 1879; and I do not wish to be understood as laying claim to any such process.

What I claim as new, and desire to secure by Letters Patent, is—

1. The process herein described of introducing a small stream of dilute acid from the evaporating-pan of about 60° Baumé into a large quantity of acid of the strength of 66° Baumé contained in a concentrating-pan and kept at the boiling-point, substantially as hereinbefore described.

2. In an apparatus for concentrating sulphuric acid, a cast-iron concentrating-pan provided with an inwardly-projecting flange below the acid line, and with an arch and ends of fire-brick and tiles, respectively, an interposed layer of asbestos retort-cement being arranged between the arch and sides of the pan, whereby the pan is protected and the formation of sulphate is avoided, as hereinbefore set forth.

3. In combination with the cast-iron pan A, provided with flange B, the pocket E, communicating with the bottom of the pan, and suitable means for extracting the strong acid, substantially as described.

4. In combination with the pan A, provided with flange B, arch C, and ends D, the furnace K, evaporating-pans, acid inlet and outlet, and cooler L, substantially as described.

5. In combination with the evaporating and concentrating pans, the adjustable siphon F, cup G, and pipe H, arranged and operating as described.

In testimony whereof I have hereunto set my hand in the presence of two subscribing witnesses.

JUNIUS GRIDLEY.

Witnesses:
EDWD. M. GRIDLEY,
EUGENE WAUGH.